US012643740B2

(12) United States Patent (10) Patent No.: US 12,643,740 B2
Meurer (45) Date of Patent: Jun. 2, 2026

(54) SYSTEM FOR ORDER FULFILMENT

(71) Applicant: Dematic GmbH, Heusenstamm (DE)

(72) Inventor: Hans Christoph Meurer, Framersheim (DE)

(73) Assignee: Dematic GmbH, Heusenstamm (DE)

( * ) Notice: Subject to any disclaimer, the term of this patent is extended or adjusted under 35 U.S.C. 154(b) by 524 days.

(21) Appl. No.: 18/042,409

(22) PCT Filed: Aug. 24, 2020

(86) PCT No.: PCT/EP2020/073648
§ 371 (c)(1),
(2) Date: Feb. 21, 2023

(87) PCT Pub. No.: WO2022/042821
PCT Pub. Date: Mar. 3, 2022

(65) Prior Publication Data
US 2023/0322488 A1 Oct. 12, 2023

(51) Int. Cl.
*B65G 1/137* (2006.01)

(52) U.S. Cl.
CPC .................................. *B65G 1/1373* (2013.01)

(58) Field of Classification Search
CPC .... B65G 1/1373; B65G 1/0492; B65G 1/065;
B65G 2201/0258; B65G 1/1378; B65G
60/00; B65G 2201/0267
See application file for complete search history.

(56) References Cited

U.S. PATENT DOCUMENTS

2019/0389671 A1 * 12/2019 Cohen .................... B65G 47/71

FOREIGN PATENT DOCUMENTS

| CN | 105473469 | A | 4/2016 | |
|----|-----------|----|--------|--|
| CN | 106715292 | A | 5/2017 | |
| DE | 102006025618 | A1 | 11/2007 | |
| DE | 102008026326 | A1 | 12/2009 | |
| EP | 0484150 | A1 | 5/1992 | |
| EP | 1462394 | B1 | 8/2006 | |
| EP | 2591559 | A2 | 5/2013 | |
| EP | 2741977 | A1 | 6/2014 | |
| EP | 3330201 | A1 | 6/2018 | |
| WO | 9930993 | A2 | 6/1999 | |
| WO | 2013090970 | A2 | 6/2013 | |
| WO | 2014005895 | A1 | 1/2014 | |
| WO | WO-2016041903 | A1 * | 3/2016 | ........... B65G 1/1378 |

OTHER PUBLICATIONS

International Search Report and Written Opinion from corresponding Patent Cooperation Treaty (PCT) Application No. PCT/EP2020/073648, completed Apr. 28, 2021.

* cited by examiner

*Primary Examiner* — Justin Holmes
(74) *Attorney, Agent, or Firm* — Gardner, Linn, Burkhart & Ondersma LLP

(57) ABSTRACT

A system for order fulfilment including automated stacking of mixed case packages on a support in a predetermined spatial arrangement to form a stack of mixed case packages according to an order, the system includes at least one sortation unit for receiving all trays from each traying unit and a buffer storage unit for temporary storage of the trays sourced from the diverts, and more than one palletizing unit for stacking of mixed case packages on a support in a predetermined spatial arrangement to form a stack of mixed case packages according to an order being sourced with packages from at least one detraying unit.

18 Claims, 2 Drawing Sheets

SYSTEM FOR ORDER FULFILMENT

CROSS REFERENCE TO RELATED APPLICATION

Figure 1:
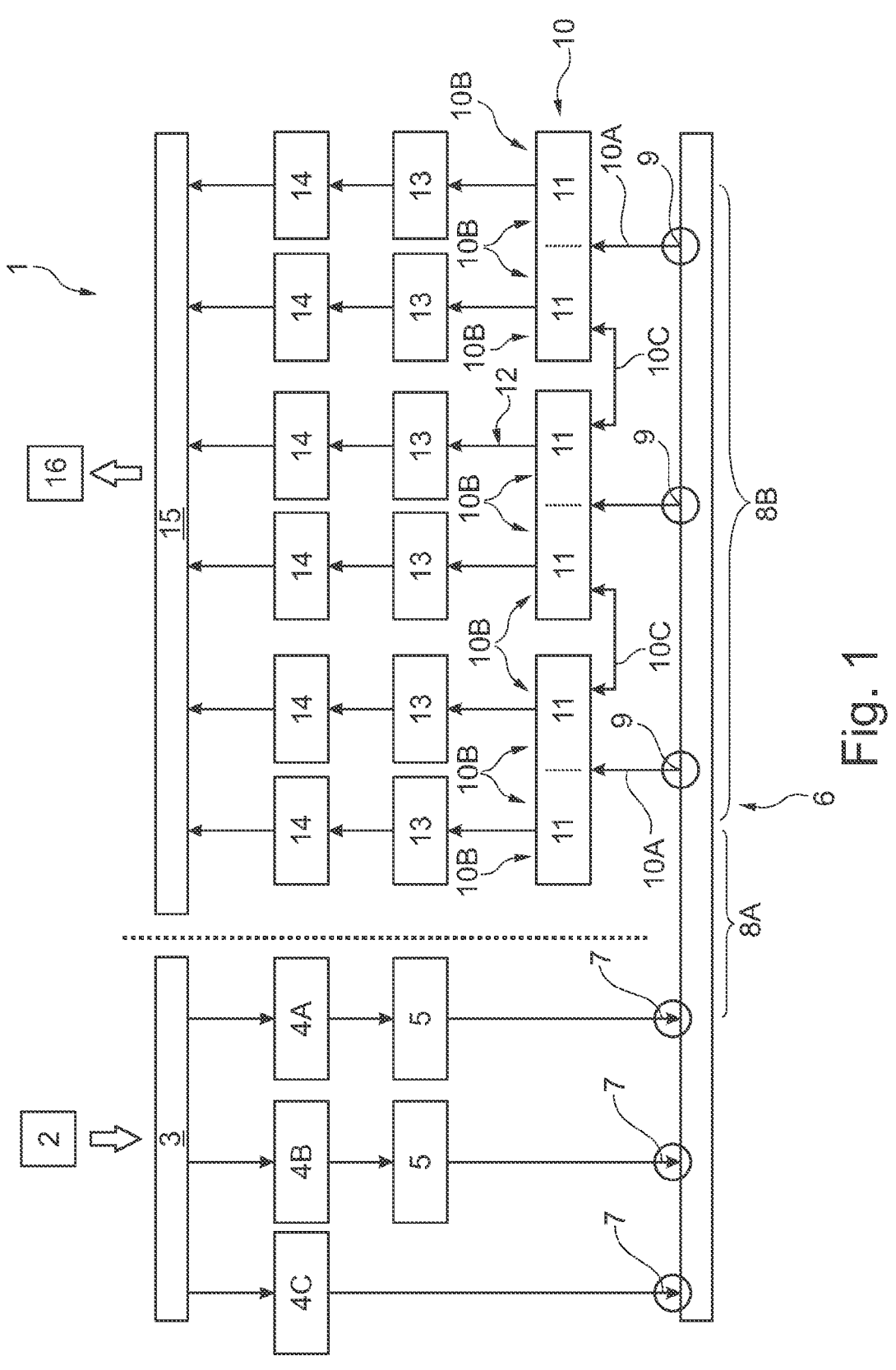

The present application claims the priority benefits of International Patent Application No. PCT/EP2020/073648, filed on Aug. 24, 2020.

BACKGROUND AND FIELD OF THE INVENTION

The invention relates to a system for order fulfilment including automated stacking of mixed case packages on a support in a predetermined spatial arrangement.

Automated stacking comprises automatic stacking without manual intervention and machine assisted manual stacking. In both cases, stacking of packages onto a support or a carrier, in particular a pallet or a trolley, according to an order to form a stack for later shipment, i.e. "palletisation", takes place. The process of loading such a load support with packages having different specifications to form a stack is so-called "mixed-case" palletisation.

In current distribution logistics, ever greater demands are placed on picking, throughput and handling of a very large magnitude of different products. Thousands of different products (or packages) of the most varied possible specifications (size, shape, weight, dimensions, surfaces, solidity etc.) must be handled by such systems.

In this case, it is necessary to consider many aspects which greatly increase complexity compared with the "simple" stacking of simple, regular geometries. Thus, a package can be properly stacked or placed on a preceding package only when this has a flat or even surface, which should also be oriented approximately horizontally, and when the package can bear the weight of the further package placed on it without being damaged.

Handling and picking systems therefore need to be developed which can process orders having such demands at high speed and in a reliable manner.

EP 1 462 394 B1 to Witron discloses a device for automatic loading of a load support with packing units forming a load stack, i.e. a palletising device. The device operates within a warehouse with a rack storage facility, designed as a pallet storage facility, i.e. the articles or goods delivered to a delivery station are stored on the delivery pallets in the pallet storage facility. In a known manner rack-mounted storage/retrieval machines are movable in the aisles formed between the rack rows and store the delivered storage pallets in the rack storage facility. Connected by an automated conveying system to the rack storage facility is a tray storage facility, which in turn comprises storage racks, which are separated by aisles and in which the articles to be stored are stored on trays. The trays are generally of a shallow, tablet-shaped design and preferably have a circumferential edge. Between pallet storage facility and tray storage facility a depalletizing device is provided, which automatically splits the storage pallet stacks into the packing units and loads these onto trays. Adjoining the tray storage facility is a loading zone, which comprises one or more palletising devices. By means of a conveying system the trays are provisionally stored or buffered in tray storage facility. As soon as one or more orders are logged, the articles and/or packing units required for the order are removed from the tray storage facility by the automated conveying system and fed in a specific order to the loading zone to the palletising devices.

SUMMARY OF THE INVENTION

The present invention provides a system for order fulfilment including automated stacking of mixed case packages on a support in a predetermined spatial arrangement, which flexibly permits high throughput and scalability and is reliable.

The system according to an embodiment of the invention comprises optionally a receiving unit for receiving pallets with packages for replenishment, optionally a storage unit for storage of the received pallets, and at least one or more of the following groups A and/or B:

Group A: one or more depalletizing units for depalletizing packages from received pallets, optionally sourced from the storage unit; one or more traying units for loading singulated depalletized packages onto trays, each tray carrying one or more packages.

Group B: one or more combined depalletizing and traying units for manual machine assisted depalletizing packages from received pallets, optionally sourced from the storage unit, and loading singulated packages onto trays, each tray carrying one or more packages.

The system further includes a preferably linear sortation unit for receiving all trays from each traying unit having a high speed main conveyor, multiple inductions from the traying units leading into the main conveyor, and multiple diverts for discharging trays from the main conveyor to a single buffer storage unit. The system further having the buffer storage unit for temporary storage of the trays sourced from the diverts and having: at least two multi-level longitudinally extending storage racks that are laterally separated by an aisle; at least two load lifting devices each having a liftable and lowerable transport platform for lifting or lowering trays; guide tracks running in at least some of the rack levels along the rack length of the aisle such that one or more storage and retrieval vehicles are displaceable along the guide tracks for transporting the trays between the storage racks and the load lifting devices in the corresponding rack levels; the guide tracks being arranged in each such level in a way that the storage and retrieval vehicles may fully access the storage racks and each load lifting device by arranging the guide tracks to extend along the aisle and past the load lifting devices; and at least one conveyor for transporting trays from the diverts to said load lifting devices and from said load lifting devices to a palletizer feed. The system further includes more than one palletizer feed sourced from load lifting devices of at least one buffer storage aisle and each palletizer feed having at least one detraying unit for unloading one or more packages from the tray, and includes more than one palletizing unit for stacking of mixed case packages on a support in a predetermined spatial arrangement to form a stack of mixed case packages according to an order being sourced with packages from at least one detraying unit.

The inventive system is beneficial because the use of the (linear) sortation unit allows any-to-any material flow within the system, meaning that packages from any depalletizing unit may be transported via any buffer storage aisle to any palletizing unit. This allows for flexible high-speed order fulfilment.

The buffer storage unit allows by design besides the buffer and supply function to the palletizing unit(s) a consolidation (storage of required packages in assigned aisle for later palletizing of specific order) and sequencing of packages for orders. This allows the integration of all these functions into a single unit doing away with the need for separate sequencing towers etc.

The system may also include a warehouse management control system for logging orders and control of system and its components. Such a warehouse management control system will also keep track of packages and the level of storage amount of those packages with in the buffer storage unit and incoming pallets in the receiving unit and the downstream storage so as to manage the amount of packages in the buffer storage unit, allowing for a constant stream of packages to the palletizing unit(s) for order fulfilment. The warehouse management control system may also include interfaces to suppliers/producers of incoming pallets so as to allow for timely replenishment.

The receiving unit is for receiving pallets with packages for replenishment from suppliers and/or producers, vendors and so on. It will have loading means for introducing such pallets into the system.

The pallets with replenishment packages are then transferred into a storage unit for storage of the received pallets. This will usually be a high bay warehouse serviced by conveyors and automated storage and retrieval systems (ASRS). Depending on size and need other forms of storage, e.g. stacked pallets on the floor etc., may be implemented.

If the number of packages in the buffer unit, i.e. stocking level, sourcing the order fulfilment by the palletizers, falls below a certain predetermined level, the warehouse management system will order packages from the storage unit. These will automatically be retrieved and discharged from the storage unit and conveyed to the depalletization unit(s). Received pallets may also be directly sent to the depalletization area.

At the depalletizing unit the received pallets will be delayered/depalletized. The depalletizing unit may be a fully automatic or a machine assisted manual unit, depending on through put necessities and kind of goods. Emptied pallets will be sent to the receiving unit for reuse via an appropriate conveyor system.

As the interface to the storage unit upstream and to the traying unit downstream are standardized, the number of depalletizers used may be changed for perfect sizing according to delayering rates (pallet and package flow) and/or the depalletizers of the depalletizing unit may be interchangeably swapped from manual to automatic.

For depalletizing and traying the system will include at least one or more of the following groups A and/or B:

Group A: one or more depalletizing units for depalletizing packages from received pallets, optionally sourced from the storage unit; one or more traying units for loading singulated depalletized packages onto trays, each tray carrying one or more packages.

Group B: one or more combined depalletizing and traying units for manual machine assisted depalletizing packages from received pallets, optionally sourced from the storage unit, and loading singulated packages onto trays, each tray carrying one or more packages.

In other words, group A comprises separated depalletizing (delayering), singulating and traying process, either fully automatic or automated in the sense of manual and machine assisted, whereas group B comprises a combined process of depalletizing individually and placing directly on trays. The system may include either or both of the groups (or several) depending on throughput needs.

In automatic operation packages are picked from the pallet layer wise and placed on a dedicated conveyor. The delayered packages are then singulated. Afterwards the packages are loaded onto trays either individually or more than one in the traying unit.

Before traying, package orientation is checked and possibly changed by turning/toppling if necessary and the identity of the packages is verified.

The automatic traying unit itself may be similar to that of FIG. 6 of WO 99/30993 A2 to Crisplant and include dropping packages onto trays from an upper parallel and aligned conveyor onto trays onto a synchronized, parallel and aligned lower conveyor. If more than one size of trays is used, such traying unit may have staggered tray carrying conveyors below the package conveyor that allow to drop the package(s) according to size on the respective tray. For example, if full and half size trays are used, one conveyor for each tray size is implemented as explained and the smaller trays may be conveyed either with short or long side leading, depending on the orientation of the package and the space on the conveyor. It will usually be preferred that all trays are conveyed with short side leading with the packages being also respectively oriented, i.e. with short edge leading too.

In manual operation packages are picked from the product pallet package wise and placed on a dedicated conveyor in a singulated manner and then trayed either individually or more than one or optionally placed directly onto a tray.

The trays may carry one or more package depending on size of the packages. Further dimensions may be checked before leaving the traying unit and if rejected the corresponding tray may be sent to a rejection unit/station (see below).

By use of trays throughout the following parts of the system it is possible to achieve high throughput in a reliable manner.

The trays used have a two-piece design that allows for safe transport and easy detraying. They comprise a frame and within that frame a moveable bottom as detailed in DE 10 2008 026 326 A1. As such the use of trays increases process-safety and reduces errors in the system, especially in the high rate sortation unit and buffer unit. Potential restrictions for rigidity (characteristics) of package bottoms arising from a use of multiple holes and pins as known from EP 1 462 394 B1 do not apply.

It also allows for future-proof design as the change of packaging and their wrapping types does not need a change of system components (holding the packages on a flat surface without holes or groves etc. is the most generic way which is different from the vast majority of state of the art applications).

It is especially preferred that the system uses two tray sizes, a full and half size tray, allowing high density transport and storage and at the same time reducing complexity. As such the half size trays may be stored in the buffer storage unit long side leading and then use the same storage slot width as the large full size trays.

The sortation unit allows to handle many thousand trays/packages per hour and at the same time a flexible material flow in the system in an any-to-any manner. The use of the sortation unit allows any-to-any material flow within the system, meaning that packages from any depalletizing unit may be transported to any buffer storage aisle. This allows for flexible high-speed order fulfilment, as now any palletizing unit can be sourced with packages from any depalletizing unit. In a preferred embodiment the sortation unit is a high rate or high speed sortation unit.

Multiple inductions from the traying units of group A and/or B will lead into the main conveyor. These induction lines may be dedicated induction lines or zipper merged induction lines. Preferably the sortation unit is connected to each depalletization unit or depalletizer itself and downstream of the respective traying unit(s) by a dedicated induction line. Alternatively, two or more traying unit(s) may use a joint induction line, which is fed in a zipper merged fashion from the respective traying unit(s). This reduces the number of inductions into the main conveyor, which is beneficial in terms of space. Such induction line can be implemented in many ways, especially as an accumulation induction line that merges into the main conveyor. Such induction line will under control of the warehouse management control system preferably release all packages to be grouped batchwise.

The sortation unit for receiving all trays from each traying unit will preferably further have a high speed main conveyor and multiple diverts for discharging trays from the main conveyor to a single buffer storage unit. The sortation unit includes the main conveyor and a sorter with multiple diverts. Such sorter with multiple diverts will preferable be implemented by a linear sorter, most preferred the diverts being of the slat and shoe type. Alternatively, right-angle-transfers (RAT), 45 degree diverts, roller table and strand conveyors, pop-up diverts, steerable wheel diverts etc. may be used as diverts.

The main conveyor will be a high speed roller or belt conveyor. Such a high speed main conveyor will preferably have a handling rate of 3,000-30,000 articles/trays per hour; even more preferred a handling rate of 6,000-24,000 articles/trays per hour. Especially preferred a handling rate of 9,000-20,000 articles/trays per hour. Respectively the diverts have the same handling capacity. The most preferred diverts being of the slat and shoe type have the advantage that their handling rate is higher than that of the others mentioned above and allows to achieve the given rates between 3,000 and 30,000 articles/trays per hour.

Upstream of the diverts (after the induction) a gapping section may be arranged to standardize gaps between trays, which facilitates diverting.

The diverts will feed lines leading to the buffer storage unit. Preferably, each aisle is fed from one divert by a dedicated discharge line. Even more preferred each line will feed two inbound lifts of the same aisle in the buffer storage unit. Or in other words, each aisle has at least two inbound lifts which are fed from one divert by a dedicated discharge line that has a switch or turnout etc. (for splitting the flow of trays) leading to either of the two lifts.

Preferably, a single sortation unit is present in the system. It is however possible to also have two parallel sortation units in very large systems. These can be sourced in parallel by the depalletization unit(s) and discharge into a single buffer storage unit or into a separate buffer storage unit each.

Downstream of the diverts a re-looping section may be arranged to allow for reintroduction of trays not diverted due to too high load, errors etc. Such re-looping section may include a conveyor leading back to the induction lines. To control routing of trays to this section, i.e. pass through the diverts, a detection unit for detecting wrong dimensioned packages (especially height) can be installed upstream of the diverts (especially in the traying unit). It is also possible to first store such "faulty" trays in the buffer storage and later discharge them to a rejection unit. The re-looping unit may also include a rejection unit for handling packages that are rejected (e.g. due to dimension check failure) and need manual reworking or confirmation before being inducted. This rejection unit may therefore also be connected to the traying units directly and handle packages rejected in the traying process. After the rejection unit a further detection unit for checking dimensions of reworked packages on trays before re-entering the inductions may be installed.

Normally, all trays will be diverted and introduced into the buffer storage unit. The buffer storage unit is for temporary storage of the trays sourced from the diverts for sourcing the palletizers with the respective packages. The buffer storage unit will at least include: (i) at least two multi-level longitudinally extending storage racks that are laterally separated by an aisle; (ii) at least two load lifting devices each having a liftable and lowerable transport platform for lifting or lowering trays; (iii) guide tracks running in at least some of the rack levels along the rack length of the aisle such that one or more storage and retrieval vehicles are displaceable along the guide tracks for transporting the trays between the storage racks and the load lifting devices in the corresponding rack levels; (iv) said guide tracks being arranged in each such level in a way that the storage and retrieval vehicles may fully access the storage racks and each load lifting device by arranging the guide tracks to extend along the aisle and past the load lifting devices; and (v) at least one conveyor for transporting trays from the diverts to said load lifting devices and from said load lifting devices to a palletizer feed.

The conveyor for transporting trays from the diverts to the load lifting devices will preferably be implemented to connect each sorter take away (line after divert) to the two inbound lifts of one buffer storage unit aisle. At the same time this will allow to turn large trays from short edge leading to long edge leading for space saving storage. The conveyor for transporting trays may also include a detection device to detect if a tray is occupied by a package, as the buffer storage unit will double functionally as an empty tray stack storage and as such allow storage of empty tray stacks and their discharge and supply to the traying units. On the conveyors after the diverts, a further detection unit may be installed for again checking dimensions/orientation of packages and also loading of the trays, as due to the very high speeds and forces associated therewith, packages may shift.

If the conveyor for transporting trays to a specific aisle is overloaded, the warehouse management control system may redirect trays to an alternate aisle for introduction into e.g. a neighboring storage aisle, as described in EP 3 330 201 A1. If necessary, such tray may then be rerouted to the destination aisle using inter-aisle transfer technology described in EP 2 741 977 A1. In general trays may distributed and transferred with the storage buffer using inter-aisle transfer technology described in EP2 741 977 A1.

The storage buffer unit will have inbound and outbound conveyor connections on different levels and also on differing levels for different functions. One level will contain the inbound traffic from the diverts of the sortation unit. One or two levels will contain the outbound consolidated and sequenced traffic to the palletizing units, depending on number of palletizing units. A further level will handle outbound traffic which is non-palletizer related, i.e. empty trays stack handling. In a preferred version the buffer storage unit will have three load lifting devices with separate conveyors on different levels on one side of an aisle and a further load lifting device on the other side of the aisle with a separate straight conveyor.

In a preferred embodiment the rack storage system will comprise multiple multi-level longitudinally extending double deep storage racks that are laterally separated by an aisle. In each level guide tracks for shuttles (as storage and retrieval vehicles) extend the length of the aisle and past at least two load lifting devices each having a liftable and lowerable transport platform for lifting or lowering trays.

The guide tracks being arranged in each such level in a way that the shuttles may fully access the storage racks and each load lifting device by arranging the guide tracks to extend along the aisle and past the load lifting devices. The shuttles are designed to transfer the trays between the storage locations in the storage racks and the load lifting devices To decouple this exchange buffer conveyors are arranged on one side of each load lifting device. The other side of each load lifting device is connected to a conveyor for transporting trays to and from said load lifting devices.

In a preferred embodiment, each aisle will have four load lifting devices or lifts. Two each will be inbound lifts and two will be outbound lift. The two inbound lifts will be on opposite sides of the aisle and the two outbound lifts on the same side of the aisle. As such, the conveyors connecting to the outbound lifts on the same side of the aisle will circumvent the respective other outbound lift and also the inbound lift. The conveyors may be arranged at different levels of the storage racks.

The storage and retrieval vehicles or shuttles may be single-level servicing shuttles or multiple-level servicing shuttles, i.e. a shuttle would be able to access two or more levels, usually not more than five levels. Depending on the style of shuttle, the guide tracks are only present in the corresponding levels. It is also possible to use standard ASRS machines (mini loads) as automatic storage and retrieval vehicles which include single level and multilevel rack serving units.

The storage and retrieval vehicles will have a load handling area which is serviced by load handling devices usually in the form of telescopic arms which are extendable to both sides of the aisle and include multiple fingers, which can be driven between an engaging and a non-engaging orientation, each to contact the tray for pushing/pulling it. The telescopic arms usually have double deep or higher working range. The respective guide tracks do not only provide a running surface for the storage and retrieval vehicles but also may provide energy transfer (e.g. electricity transfer via collectors) and/or control and information signal transfers (e.g. transfer via collectors, signals being modulated onto the current, see EP 2 591 559 A1). The load handling area of the storage and retrieval vehicles is preferably sized to accept/carry one large full size tray or two small half size trays. The load handling devices allow to handle the two trays at the same time. In other words the shuttle can transport and/or move (e.g. discharge/store) one or more trays at the same time.

As such the buffer unit is scalable for performance and capacity by adding shuttles and/or space. By design it allows for order consolidation and sequencing besides the buffering. This means that all packages for a certain order may be consolidated and stored in dedicated aisles such that they can then be discharged in a predetermined sequence to the palletizer to allow an optimal stack building. The sequencing is achieved by use of the shuttle and lifts to sort the order of packages on the discharge line leading in to the palletizer feed(s).

Preferably one or two aisles will be connected to each palletizer by the palletizer feed, sourced from load lifting devices of at least one buffer storage aisle and each palletizer feed having at least one detraying unit for unloading a package from the tray. This achieves fewer handling errors due to use of trays and one package per tray. The detraying unit further includes alignment and orientation sections to align and orient (turn) trays before detraying itself takes place allowing for preorientation of packages on the trays. For detraying itself (unloading of package from tray), the detrayer lifts the loose bottom of the tray and the package(s) is/are pushed off. As this happens outside of the palletizer unit empty tray handling is simplified and not constrained by the space available.

Detrayed packages may be grouped into pairs—side by side in travel direction and/or one-after-the-other in travel direction—and can be created at the detrayer itself or the following conveyors. This allows jointly handling palletizing such groups which increases throughput. The detraying unit further includes an empty tray handling. Such will include forming stacks of empty trays and either sending these to the traying units or storage in the buffers storage as described above.

Downstream of the detraying unit(s) the unloaded packages are conveyed to the palletizer of the one or more palletizing unit for stacking of mixed case packages on a support in a predetermined spatial arrangement to form a stack of mixed case packages according to an order. The palletizers itself may be fully automatic or assisted manual. Such fully automatic palletizers may be implemented as described in WO 2014/005895 A1. Sequence of packages provide at palletizer is predetermined based on order information and preferences (shop layout etc.) and computed by warehouse management software module (pack builder).

As the interface to the detraying unit upstream and to the discharge downstream are standardized, number of palletizers used may be changed for perfect sizing according to order fulfilment rates (pallet and package flow) and/or the palletizers of the palletizing unit may be interchangeably swapped from manual to automatic. For increased scalability, an aisle of the buffer storage may be connected to one or two palletizer units. Alternatively or additionally, two aisles of the buffer storage may be connected to one or two palletizer units. The palletizers may include a wrapping unit for securing finished pallets for transport.

Finished pallets will be discharged by conveyor or AGV to a dispatch and loading area or alternatively to a buffer.

In other words, the invention combines several aspects together to achieve an overall benefit in terms or reliance and throughput: (i) Use of trays to route and sort packages to buffer unit, allowing integrated consolidation and sequencing; (ii) Routing and sorting of trays using high rate sortation for full inbound control to every aisle of buffer storage (all depalletizers to all aisles of buffer storage); (iii) Full flexibility to use automatic and/or manual depalletizers; (iv) Full flexibility to use automatic and/or manual palletizers; (v) Direct transport of sequenced packages from buffer unit to palletizers enabled by inter aisle transfer (see above) for in-buffer consolidation; (vi) Scalability to use one or two palletizers per buffer/sequencer aisle.

This is also achieved by use of standardized interfaces between modularized units. Especially between the one, several or all of receiving unit, storage unit, depalletizing unit, traying unit, high rate sortation unit, buffer storage unit, detraying unit, palletizing unit. It is especially preferred that the interfaces allow scalability by adding additional units to the depalletizing unit, traying unit, detraying unit and/or palletizing unit. The standardized interfaces also allow to swap a manual for an automated or fully automatic unit, especially the depalletizing unit and/or palletizing unit.

It is also possible to duplicate the units using the buffer storage unit as a central shared element with inbound and outbound connections on both sides/ends of the aisles such that the system has duplicate receiving and storage units as well as depalletizing and traying units as well as sortation units and palletizing units all connected by buffer storage unit bridging the system halves.

Further features and details of the invention will be apparent from the description hereinafter of the drawings.

DESCRIPTION OF THE PREFERRED EMBODIMENTS

Figure 2:
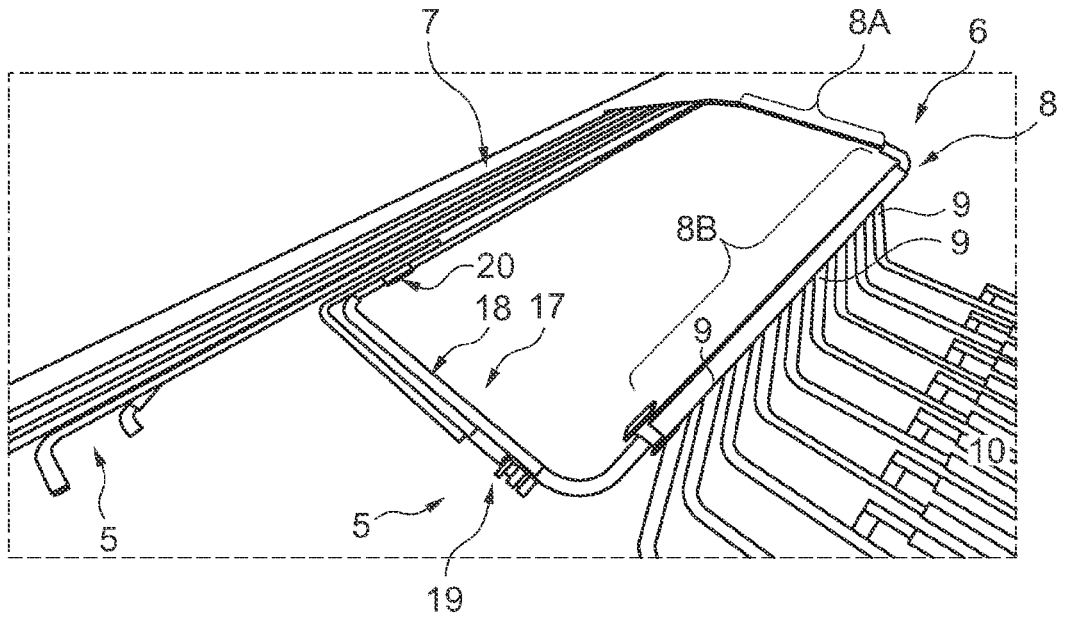

FIG. 1 shows a schematic block diagram of a system according to the invention; and FIG. 2 shows a schematic perspective view of a sorting unit of a system of FIG. 1.

DESCRIPTION OF THE PREFERRED EMBODIMENTS

In the figures a system according to the invention is denoted as a whole with 1. The system 1 is for order fulfilment including automated stacking of mixed case packages on a support in a predetermined spatial arrangement to form a stack of mixed case packages according to an order.

The illustrated system includes a receiving unit 2 for receiving pallets with packages for replenishment, a storage unit 3 for storage of the received pallets, more than one depalletizing unit 4 for depalletizing packages from the received pallets sourced from the storage unit, more than one traying unit 5 for loading singulated depalletized packages onto trays, each tray carrying a single package, and at least one linear sortation unit 6 for receiving all trays from each traying unit having a main conveyor 8, multiple inductions 7, one from every traying unit 5, leading into the main conveyor 8, and multiple diverts 9 for discharging trays from the main conveyor 8 to a buffer storage unit 10. The system further includes a buffer storage unit 10 for temporary storage of the trays sourced from the diverts 9 and having at least two multi-level longitudinally extending storage racks that are laterally separated by an aisle 11, more than one said palletizer feed 12 sourced from load lifting devices of at least one buffer storage aisle 11 and each palletizer feed 12 having at least one detraying unit 13 for unloading a package from the tray, and more than one palletizing unit 14 for stacking of mixed case packages on a support in a predetermined spatial arrangement to form a stack of mixed case packages according to an order being sourced with packages from at least one detraying unit 13.

Finished order pallets are conveyed to dispatch pallet order sequence buffer 15 and then on to pallet dispatch area 16.

The storage unit 3 for storage of the received pallets will be a high bay warehouse that is served by conveyors from the receiving unit and has automated storage and retrieval machines operating in the aisles to store and retrieve pallets based on warehouse control instructions.

Retrieved pallets containing packages needed will be conveyed to the depalletization units designated where the pallets are either fully automatic delayered and then singulated or manually depalletized under machine assistance and individually placed on a conveyor or directly onto a tray on the conveyor. After the packages are singulated they may be checked for identity and orientation and if necessary reoriented by turning and/or toppling devices before entering the respective traying unit 5. This may be done by at least one or more of the following groups A and/or B. Group A may include: (i) fully automatic depalletizing units 4A for delayering and singulating packages from received pallets, or automated manual (machine assisted) depalletizing units 4A and singulating packages from received pallets; and (ii) one or more traying units 5 for loading singulated depalletized packages onto trays, each tray carrying a single package in this embodiment. Group B may include one or more combined depalletizing and traying units 40 for manual machine assisted depalletizing packages from received pallets and loading singulated packages individually onto trays, such that each tray carries a single package only (in this embodiment). It is also possible to place two or more packages on a tray.

In the traying units 5 packages are dropped onto trays from an upper parallel and aligned conveyor onto trays onto a synchronized, parallel and aligned lower conveyor. As two size trays are used, such traying unit has two staggered tray carrying conveyors below the package conveyor that allow to drop the package according to size on the respective tray. As full and half size trays are used, one conveyor for each tray size is implemented as explained.

By use of trays throughout the following parts of the system it is possible to achieve high throughput in a reliable manner. The trays used have a two-piece design that allows for safe transport and easy detraying. They comprise a frame and within that frame a moveable bottom as detailed in DE 10 2008 026 326 A1.

From the traying units 5 the trays loaded with a single package are sent to accumulation induction lines 7 which are used to zipper merge the trays onto the main conveyer line 8 of the (linear) sortation unit 6. The induction lines 7 can be dedicated per traying unit (or combined depalletizing and traying units) or shared by pre-merging lines coming from the traying units (or combined depalletizing and traying units).

After the induction trays will enter a gapping section 8A arranged to standardize gaps between trays, which facilitates diverting in the diverting section 8B.

The diverts 9 in diverting section 8B of the high rate linear sortation unit will be of the slat and shoe type as basically described in EP 0 484 150 A1.

Downstream of the diverts 9 a re-looping section 17 is arranged to allow for reintroduction of trays not diverted due to too high load, errors etc. Such re-looping section 17 includes a conveyor 18 leading back to the induction lines 7. To control routing of trays to this section, i.e. pass through the diverts, a detection unit for detecting wrong dimensioned packages (especially height) is installed upstream of the diverts in the traying unit. It is also possible to first store such "faulty" trays in the buffer storage 10 and later discharge them to a rejection unit 19 also included in the re-looping unit 17 for handling packages that are rejected (e.g. due to dimension check failure) and need manual reworking or confirmation before being inducted. This rejection unit 19 is therefore also connected to the traying units directly 20 and handles packages rejected in the traying process. After the rejection unit a further detection unit 20 for checking dimensions of reworked packages on trays before re-entering the inductions 7 is installed.

The diverts 9 feed lines leading to the buffer storage unit 10. In particular each line will feed two inbound lifts 10A of the same aisle 11 in the buffer storage unit 10. Alternatively the aisle 11 may be serviced by a single inbound lift 10A. The conveyor for transporting trays from the diverts 9 to the load lifting devices is implemented to connect each sorter take away (line after divert) to the two inbound lifts 10A of each aisle. At the same time this allows to turn large trays from short edge leading to long edge leading for space saving storage. If the conveyor for transporting trays to a specific aisle is overloaded, the warehouse management control system may redirect trays to an alternate aisle 11 for introduction into e.g. a neighboring storage aisle. If necessary, such tray may then be rerouted to the destination aisle 11 using inter-aisle transfer as indicated by arrow 10C.

The buffer storage unit 10 includes several multi-level longitudinally extending storage racks 10B that are laterally separated by an aisle 11. The storage buffer unit 10 has inbound and outbound conveyor connections on different levels and also on differing levels for different functions. One level will contain the inbound traffic to the inbound lifts 10A from the diverts 9 of the sortation unit 6. One or two levels contain the outbound consolidated and sequenced traffic to the palletizing units, depending on number of palletizing units. A further level will handle outbound traffic which is non-palletizer related, i.e. empty trays stack handling.

The rack storage system comprises multiple multi-level longitudinally extending double deep storage racks 10B that are laterally separated by an aisle 11. In each level guide tracks for shuttles (as storage and retrieval vehicles) extend the length of the aisle and past at least two load lifting devices 10A each having a liftable and lowerable transport platform for lifting or lowering trays. Said guide tracks being arranged in each such level in a way that the shuttles may fully access the storage racks and each load lifting device by arranging the guide tracks to extend along the aisle and past the load lifting devices. The shuttles are designed to transfer the trays between the storage locations in the storage racks and the load lifting devices 10A. To decouple this, exchange buffer conveyors are arranged on one side of each load lifting device 10A. The other side of each load lifting device 10A is connected to a conveyor for transporting trays to and from said load lifting devices.

Each aisle has four load lifting devices or lifts 10A. Two each are inbound lifts and two are outbound lifts. The two inbound lifts are on opposite sides of the aisle 11 and the two outbound lifts are on the same side of the aisle 11. As such, the conveyors connecting to the outbound lifts on the same side of the aisle circumvent the respective other outbound lift and also the inbound lift. The conveyors are arranged at different levels of the storage racks 10B.

The shuttles are single-level servicing shuttles and have a load handling area which is serviced by load handling devices in the form of telescopic arms which are extendable to both sides of the aisle and include multiple fingers, which can be driven between an engaging and a non-engaging orientation, each to contact the tray(s) for pushing/pulling it/them. The telescopic arms have double deep and higher working range.

The respective guide tracks do not only provide a running surface for the storage and retrieval vehicles but also may provide energy transfer (e.g. electricity transfer via collectors) and/or control and information signal transfers (e.g. transfer via collectors, signals being modulated onto the current, see EP 2 591 559 A1).

The load handling area of the shuttles is sized to accept/carry one large full size tray or two small half size trays. When transporting two half size trays, the load handling devices may mover these two trays together, i.e. at the same time. By design it allows for order consolidation and sequencing besides the buffering. This means that all packages for a certain order may be consolidated and stored in dedicated aisles such that they can then be discharged in a predetermined sequence to the palletizer to allow an optimal stack building. The sequencing is achieved by use of the shuttle and outbound lifts 10A to sort the order of packages on the discharge line leading into the palletizer feed(s) 12.

One or two aisles 11 are connected to each palletizer 14 by the palletizer feed 12 via the detraying unit 13. The detraying unit 13 further includes alignment and orientation sections to align and orient (turn) trays before detraying itself takes place allowing for preorientation of packages on the trays. For detraying itself (unloading of package from tray), the detrayer lifts the loose bottom of the tray up within the frame to a height of the rim and the package is pushed off sideways. The detraying unit 13 further includes an empty tray handling. Such will include forming stacks of empty trays and either sending these to the traying units or storage in the buffers storage as described above.

Downstream of the detraying unit(s) the unloaded packages are conveyed to the palletizer(s) of more than one palletizing unit 14 for stacking of mixed case packages on a support in a predetermined spatial arrangement to form a stack of mixed case packages according to an order. The palletizers 14 itself are fully automatic or manual with machine assistance. Such fully automatic palletizers may be implemented as described in WO 2014/005895 A1.

The sequence of packages provide at palletizer is predetermined based on order information and preferences (shop layout etc) and computed by a warehouse management software module dedicated to virtual configuration of the final stack layout to be palletized based on the packages in the respective order. The palletizers 14 include a wrapping unit for securing finished pallets for transport. Finished pallets are discharged by conveyor or AGV 15 to a dispatch and loading area 16 or alternatively to a buffer.

The invention claimed is:

1. A system for order fulfilment including automated stacking of mixed case packages on a support in a predetermined spatial arrangement to form a stack of mixed case packages according to an order, the system comprising:
   at least one or more of the following groups A and/or B;
      group A comprising (i) one or more depalletizing units for depalletizing packages from received pallets, and (ii) one or more traying units for loading singulated depalletized packages onto trays, each tray carrying one or more packages;
      group B comprising (i) one or more combined depalletizing units and traying units for manual machine assisted depalletizing packages from received pallets, and loading singulated packages onto trays, each tray carrying one or more packages;
   at least one sortation unit for receiving all trays from each traying unit of group A and/or B, said sortation unit comprising;
      a main conveyor;
      multiple inductions from the traying units of group A and/or B leading into the main conveyor; and
      multiple diverts for discharging trays from the main conveyor;
   a buffer storage unit, wherein the multiple diverts discharge trays from the main conveyor to the buffer storage unit for temporary storage of the trays sourced from the diverts, said buffer storage unit comprising;
      at least two multi-level longitudinally extending storage racks that are laterally separated by an aisle;
      at least two load lifting devices each having a liftable and lowerable transport platform for lifting or lowering trays;
      guide tracks running in at least some of the rack levels along the rack length of the aisle such that one or more storage and retrieval vehicles are displaceable along the guide tracks for transporting the trays between the storage racks and the load lifting devices in the corresponding rack levels;

said guide tracks being arranged in each such level in a way that the storage and retrieval vehicles may fully access the storage racks and each load lifting device by arranging the guide tracks to extend along the aisle and past the load lifting devices; and at least one conveyor for transporting trays from the diverts to said load lifting devices and from said load lifting devices to a palletizer feed;

one or more said palletizer feed sourced from load lifting devices of at least one buffer storage aisle and each palletizer feed having at least one detraying unit for unloading one or more packages from the tray; and one or more palletizing unit for stacking of mixed case packages on a support in a predetermined spatial arrangement to form a stack of mixed case packages according to an order being sourced with packages from at least one detraying unit.

2. The system according to claim 1, wherein an interface to the storage unit upstream and to the traying unit downstream are standardized and/or wherein the interface to the detraying unit upstream and to the discharge downstream are standardized.

3. The system according to claim 1, wherein the system uses two tray sizes, a full size tray and a half size tray.

4. The system according to claim 1, wherein the sortation unit is operable and configured to enable any-to-any material flow whereby packages from any depalletizing unit may be transported to any aisle of the buffer storage unit.

5. The system according to claim 1, wherein the sortation unit comprises a linear sortation unit having a handling rate of 3,000 to 30,000 trays per hour.

6. The system according to claim 1, wherein multiple inductions from the traying units of group A and/or B lead into the main conveyor.

7. The system according to claim 1, wherein two or more traying units use a joint induction line.

8. The system according to claim 1, wherein the sortation unit further includes a gapping section arranged to standardize gaps between trays.

9. The system according to claim 1, wherein each aisle of the buffer storage unit is fed from one divert by a dedicated discharge line.

10. The system according to claim 9, wherein each discharge line is configured to feed two inbound lifts of the same aisle in the buffer storage unit.

11. The system according to claim 1, wherein the sortation unit includes a re-looping section downstream of the diverts that includes a conveyor leading back to the inductions.

12. The system according to claim 11, wherein the re-looping section includes a rejection unit for handling packages that are rejected.

13. The system according to claim 1, wherein the buffer storage unit has three load lifting devices with separate conveyors on different levels on one side of an aisle and a further load lifting device on the other side of the aisle with a separate straight conveyor.

14. The system according to claim 1, wherein the detraying unit includes alignment and orientation sections to align and orient trays before detraying.

15. The system according to claim 1, wherein the detraying unit includes a grouping unit for grouping detrayed packages into pairs side by side in a travel direction and/or one-after-the-other in the travel direction.

16. The system according to claim 1, further comprising a receiving unit for receiving pallets with packages for replenishment, and a storage unit for storage of the received pallets.

17. The system according to claim 16, wherein the one or more depalletizing units for depalletizing packages from received pallets of group A are sourced from the storage unit, and wherein the one or more combined depalletizing and traying units for manual machine assisted depalletizing packages from received pallets are sourced from the storage unit.

18. The system according to claim 1, wherein the at least one sortation unit for receiving all trays from each traying unit comprises a linear sortation unit.

* * * * *